(12) United States Patent
Cheong et al.

(10) Patent No.: US 7,558,187 B2
(45) Date of Patent: Jul. 7, 2009

(54) APPARATUS AND METHOD OF INITIALIZING PHASE-CHANGE OPTICAL DISK

(75) Inventors: Woo Seok Cheong, Daejeon (KR); Yong Goo Yoo, Daejeon (KR); Ho Jun Ryu, Daejeon (KR); Eun Kyoung Kim, Daejeon (KR); Mun Cheol Paek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 586 days.

(21) Appl. No.: 11/299,067

(22) Filed: Dec. 8, 2005

(65) Prior Publication Data

US 2006/0087922 A1  Apr. 27, 2006

(30) Foreign Application Priority Data

Dec. 9, 2004  (KR) ............... 10-2004-0103666

(51) Int. Cl.
*G11B 7/26* (2006.01)
*G11B 7/00* (2006.01)

(52) U.S. Cl. .................. 369/284; 369/100
(58) Field of Classification Search ........... 369/13.01, 369/121, 112.07, 112.12; 360/114
See application file for complete search history.

(56) References Cited

U.S. PATENT DOCUMENTS

| | | | |
|---|---|---|---|
| 5,197,060 A * | 3/1993 | Yatake | 369/283 |
| 6,335,069 B1 | 1/2002 | Ogawa et al. | |
| 6,511,788 B1 | 1/2003 | Yasuda et al. | |
| 6,587,429 B1 | 7/2003 | Conturie et al. | |
| 6,807,142 B1 | 10/2004 | Nagata et al. | |
| 2003/0043712 A1 | 3/2003 | Nakamura et al. | |
| 2004/0081069 A1 * | 4/2004 | Suenaga et al. | 369/275.4 |
| 2004/0207995 A1 * | 10/2004 | Park et al. | 362/31 |
| 2005/0003106 A1 * | 1/2005 | Isozaki | 427/595 |

FOREIGN PATENT DOCUMENTS

| | | |
|---|---|---|
| EP | 1 258 874 | 11/2002 |
| GB | 1 581 998 | 12/1980 |
| GB | 2 326 246 | 12/1998 |
| JP | 62-97885 | 5/1987 |
| JP | 63 200866 A | 8/1988 |
| JP | 2000-113518 | 4/2000 |
| JP | 2001-344835 | 12/2001 |
| JP | 2002-92990 | 3/2002 |
| JP | 2003-123326 | 4/2003 |
| KR | 10-1997-0063084 | 9/1997 |
| WO | WO98/47142 | 10/1998 |
| WO | WO 03/067582 A1 | 8/2003 |

* cited by examiner

*Primary Examiner*—Hoa T Nguyen
*Assistant Examiner*—Andrew J Sasinowski
(74) *Attorney, Agent, or Firm*—Blakely, Sokoloff, Taylor & Zafman LLP

(57) ABSTRACT

Provided is an apparatus and method of initializing a recording layer used in manufacturing a phase-change optical disk for storing information. The optical disk is initialized using a UV lamp in order to initialize the recording layer of the phase-change optical disk capable of repeatedly writing information, without a separate optical head, whereby it is possible to increase productivity by remarkably reducing an initialization time of the optical disk since a large area is initialized using a UV beam.

19 Claims, 6 Drawing Sheets

FIG. 7

APPARATUS AND METHOD OF INITIALIZING PHASE-CHANGE OPTICAL DISK

CROSS-REFERENCE TO RELATED APPLICATION

This application claims priority to and the benefit of Korean Patent Application No. 2004-103666, filed Dec. 9, 2004, the disclosure of which is incorporated herein by reference in its entirety.

BACKGROUND

1. Field of the Invention

The present invention relates to an apparatus and method of initializing a phase-change optical disk capable of repeatedly recording information, and more particularly, to an apparatus and method of initializing an optical disk which uses a UV lamp in order to crystallize a phase-change recording layer.

2. Discussion of Related Art

In general, in manufacturing an optical disk using a phase-change medium, initial crystallization means to make the phase-change medium into a zero-base. The optical disk can be recorded by instantly melting and rapidly quenching the disk using a laser beam to form an amorphous mark.

Figure 1:
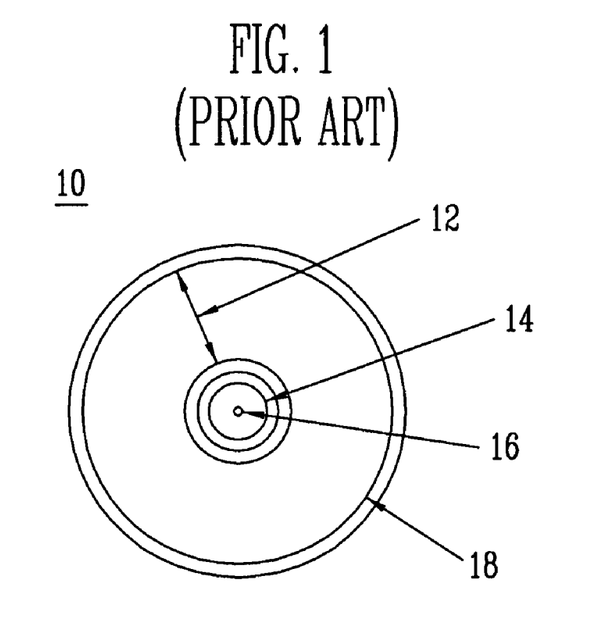
FIG. 1 is a plan view of a conventional optical disk for storing optical information.

FIG. 1 is a plan view of a conventional ultra-small optical/magnetic disk. As shown in FIG. 1, the conventional ultra-small optical disk 10 includes an information recording zone 12 formed on a polycarbonate substrate, a metal hub 14 for supporting a spindle motor, and a center hole 16. A disk rim 18 having a width of 0.5~1.0 mm is formed at the outermost periphery of the optical disk 10. A process of writing or reading information on or from the ultra-small optical disk 10 will be described as follows.

Figure 2A:
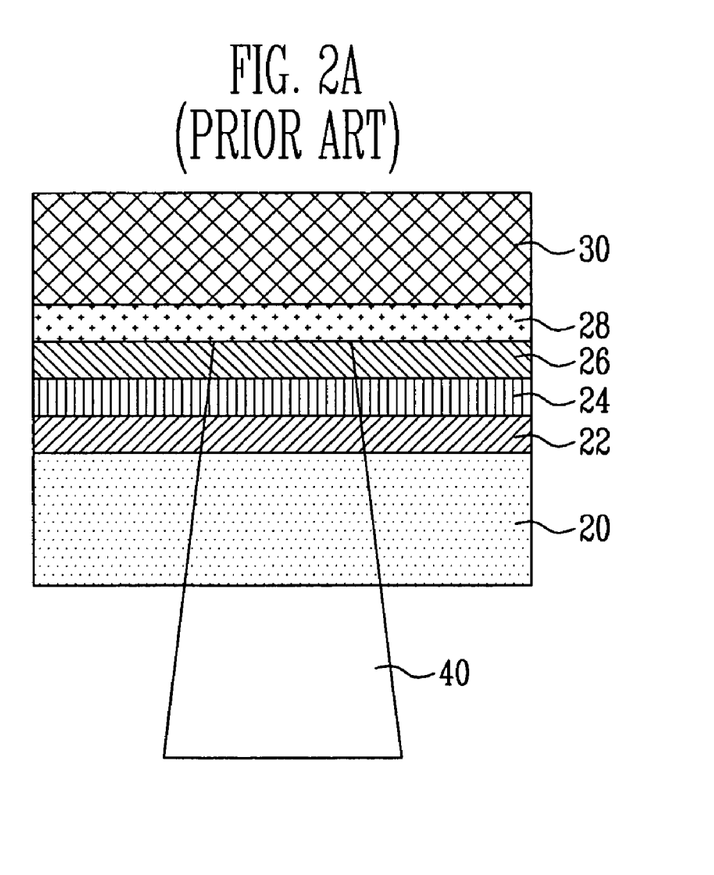
FIGS. 2A and 2B are cross-sectional views of an optical disk taken along the direction of a laser beam for recording and reproducing information.
Figure 2B:
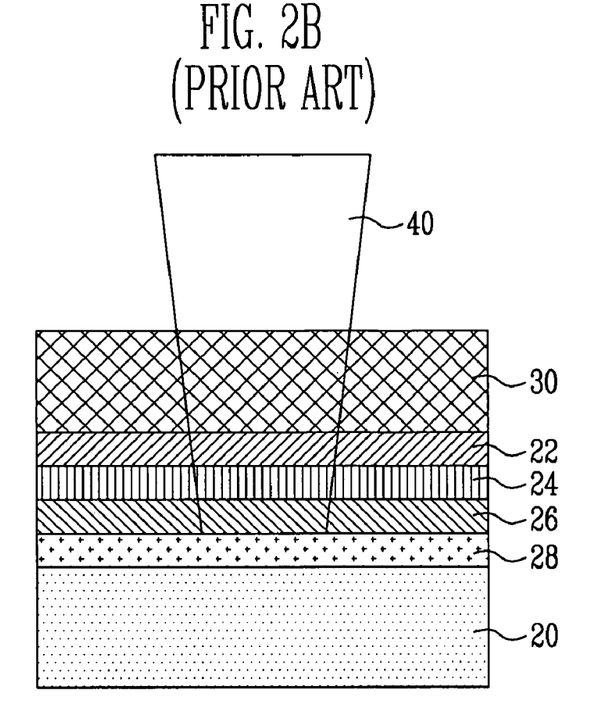

FIGS. 2A and 2B illustrate a structure of an optical disk having a phase-change medium as a recording layer, taken along a direction of a head of the optical disk. FIG. 2A is when the recording/reproducing head is opposite to the recording layer, and FIG. 2B is when the recording/reproducing head is in the same side as the recording layer. In the two cases, a laser beam 40 passes through a polycarbonate layer 20 and a first dielectric layer 22 to record a predetermined pattern on the recording layer 24 or read the recorded pattern. Then, the laser beam 40 passes through a second dielectric layer 26, but cannot pass through a reflective layer 28. A passivation layer 30 is formed on the reflective layer 28.

The most important thing in initializing the phase-change optical disk is that it may be possible to generate degradation of the polycarbonate substrate very sensitive to heat during an initial crystallization process, and an initialization time should be shorter in order to increase productivity of the disk. The polycarbonate substrate is deformed at about 130° C. Therefore, it is impossible to use a constant temperature furnace in order to initialize the phase-change optical disk.

A conventional method of initializing a phase-change medium are disclosed in Korean Patent Laid-open Publication No. 2004-75705, published on Aug. 30, 2004, entitled "Method of initializing optical recording medium", Korean Patent Laid-open Publication No. 2001-6496, published on Jan. 26, 2001, entitled "Method of manufacturing optical information recording medium and optical information recording medium manufactured using the same", U.S. Pat. No. 6,335,069, issued on Jan. 1, 2002, entitled "Phase-changeable optical recording medium, method of manufacturing the same, and method of recording information on the same", and so on. A conventional method of initializing a phase-change medium will be described with reference to the conventional arts disclosed in the Patents.

First, a typical method of initializing a phase-change medium in the conventional arts uses a high-output laser having a long wavelength of about 800 nm, and irradiates the laser on an area of several $\mu m^2$ using a head including a low aperture lens to repeatedly scan a plurality of tracks at a time while rotating a disk at a high speed, thereby uniformly initializing the entire medium. The track includes a land and a groove. In this case, an initialization apparatus is very expensive, and in the case of initializing a 5-inch disk, it takes an average time of about 1 minute.

Next, among technologies on initialization of the phase-change medium, there are two methods using a method of manufacturing a medium not requiring initialization. One method is to form a crystallization promotion layer before deposition of the recording layer. The crystallization promotion layer, referred to as "an additional layer", is made of a material having a melting point lower than that of the recording layer and a small difference between lattice constants of a crystalline phase of the recording layer and the additional layer to be easily formed as the crystalline phase on deposition of the recording layer. The crystallization promotion layer is formed of Sb, or SbTe-based alloy, Bi, or an alloy containing Bi. While the method does not requires an initialization apparatus and an initialization time, it may be possible to generate degradation of disk characteristics due to inter-diffusion between a phase-change promotion layer and the recording layer by repeating recording and reproducing operations. Another method is to increase a deposition temperature higher than the atmospheric temperature using a method of crystallizing the recording layer simultaneously with the deposition, without using the phase-change promotion layer. The recording layer has a crystallization temperature of about 150° C. and the method uses kinetic energy of particles on deposition at a temperature lower than the crystallization temperature, thereby enabling the crystallization. However, the method has a problem that the substrate may be deformed due to deterioration of the substrate when polycarbonate is used as the optical disk substrate.

Other initialization methods are to use a transparent laser having a wavelength not more than 400 nm in order to improve irregular initialization during an initialization process, and so on.

SUMMARY OF THE INVENTION

The present invention is directed to an apparatus and method of initializing a phase-change optical disk using a UV lamp on initialization of a recording layer.

The present invention is also directed to a method of initializing a large-sized area of an entire optical disk at a time using an initialization chamber having a UV lamp assembly.

One aspect of the present invention is to provide an apparatus for initializing a phase-change optical disk including: a UV lamp emitting a UV beam to an optical disk having a phase-change medium as a recording layer for a predetermined time to initialize the recording layer; and a controller supplying a power source to the UV lamp.

Preferably, the phase-change optical disk initialization apparatus further includes a chamber supporting the UV lamp and connected to the controller.

In addition, the chamber may have an inner wall coated with one of metal and oxide having a large reflectivity. The metal may include at least one of Au, Cr, and Ni, and the oxide may include at least one of aluminum oxide and zirconium oxide.

Further, the chamber may include a rotary plate for mounting the optical disk.

In addition, the chamber may be formed to maintain a distance between the UV lamp and the rotary plate by 5~30 mm, and to rotate the rotary plate at 60~600 rpm.

Further, the UV lamp may have a diameter of 5~20 mm, and emit a UV beam having a wavelength of 400 nm by 10~100%.

In addition, the UV lamp may include a UV lamp assembly having a plurality of lamps with at least one of a circular ring shape and a cylindrical rod shape. In the circular ring shaped lamp assembly, a diameter of the lamps may become larger as the lamp goes from a center to a periphery of the chamber, and a distance between the UV lamps may be maintained by a predetermined interval. At this time, preferably, the diameter of an innermost UV lamp of the circular ring shaped lamp assembly is 20~30 mm, and the diameter of an outermost UV lamp is 120~150 mm. In addition, preferably, an interval between the lamps of the cylindrical rod shaped lamp assembly is 5~20 mm, a length of the lamp is 120~150 mm, and the lamps are connected to the controller in parallel.

In addition, the controller may further include a pulse regulator for applying a shock wave to the UV lamp while a low power UV beam is emitted to the optical disk for a predetermined time.

Another aspect of the present invention is to provide a method of initializing a phase-change optical disk including: locating an optical disk in a UV beam effective region of a UV lamp in order to initialize the optical disk having a phase-change medium as a recording layer; and emitting the UV beam from the UV lamp for a predetermined time to initialize the recording layer.

Preferably, emitting the UV beam for a predetermined time includes controlling an output of the UV lamp within 50~1000 mW/10 cm, while maintaining a substrate of the optical disk at a temperature of not more than 100° C.

In addition, the method may further include applying a shock wave to the recording layer while a low power UV beam is emitted from the UV lamp for a predetermined time.

In addition, the method may further include rotating the optical disk while a UV beam is emitted from the UV lamp for a predetermined time.

Further, the phase-change medium may include a medium having a main component made of at least one selected from a group consisting of Ge, Sb, Te, In, Sn and Ga, and an additive made of at least one of Ag and Bi. For example, the phase-change medium may include one selected from a GeSbTe-based alloy and an AgInSbTe-based alloy.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 3A:
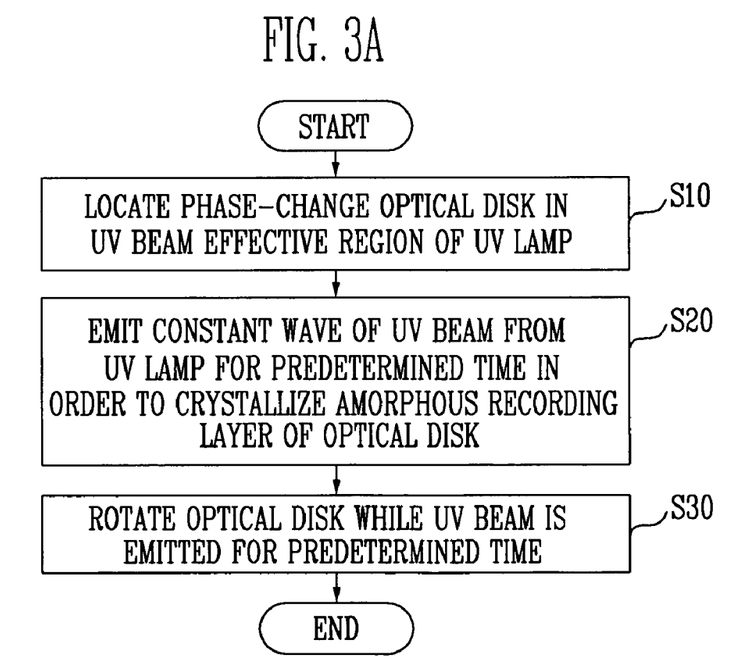
FIGS. 3A and 3B are flow charts illustrating a method of initializing an optical disk in accordance with an exemplary embodiment of the present invention.
Figure 3B:
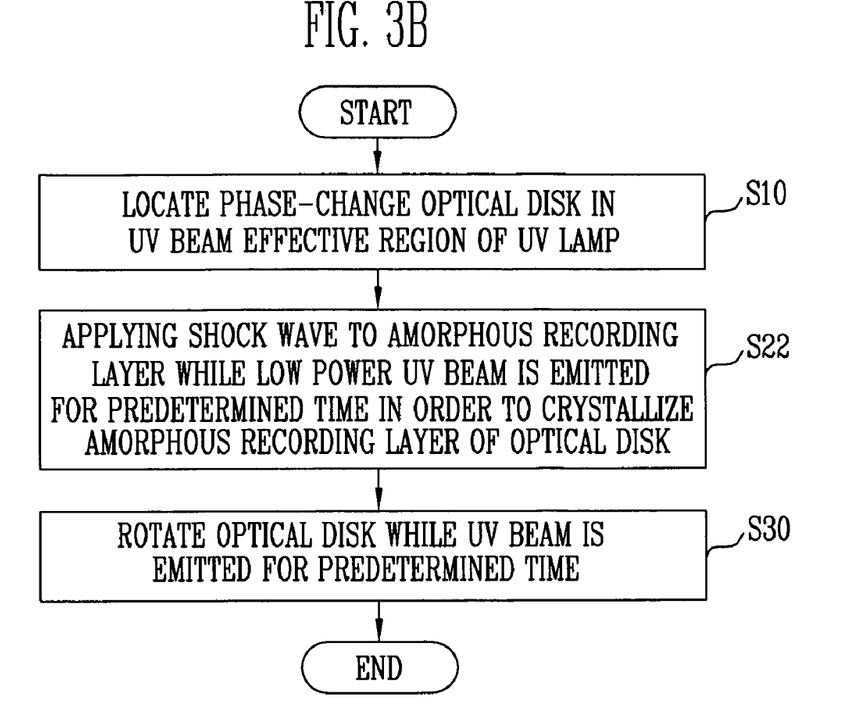

FIGS. 3A and 3B are flow charts illustrating a method of initializing an optical disk in accordance with an exemplary embodiment of the present invention.

Referring to FIG. 3A, the method of initializing a phase-change optical disk includes locating an optical disk in a UV beam effective region of a UV lamp (S10), and emitting the UV beam from the UV lamp for a predetermined time to crystallize an amorphous recording layer of the phase-change optical disk (S20).

At this time, emitting the UV beam for a predetermined time includes controlling an output of the UV lamp within 50~1000 mW/10 cm in order to maintain a substrate of the optical disk at a temperature of not more than 100° C.

The method of initializing a phase-change optical disk may include applying a shock wave to the amorphous recording layer while UV beam is emitted from the UV lamp at a low power for a predetermined time (S22), as shown in FIG. 3B. The shock wave includes a high power pulse of 1~10 times.

In addition, the method of initializing a phase-change optical disk may further include rotating the optical disk while UV beam is emitted from the UV lamp for a predetermined time (S30), as shown in FIGS. 3A and 3B. Then, a certain intensity of UV beam and a high power pulse are more uniformly transmitted to the amorphous recording layer.

In accordance with the constitution described above, it is possible to prevent a polycarbonate substrate from deteriorating when the amorphous recording layer of the phase-change optical disk is crystallized by a certain intensity of UV beam and a high power pulse of the UV lamp. In addition, a large-area of phase-change optical disk is initialized within a short time.

Meanwhile, the phase-change medium is formed of an alloy including a chalcogenide-based element having excellent characteristics as a phase-change medium. In addition, the phase-change medium includes a medium having a main component made of at least one selected from a group consisting of Ge, Sb, Te, In, Sn, Ga and so on, and additives made of at least one element selected from Ag, Bi and so on. For example, the phase-change medium is referred to as an optical disk using a GeSbTe-based alloy or an AgInSbTe-based alloy as a phase-change medium.

As described above, the present invention is focused in that beam in the UV wavelength range performs a core function in crystallization of the recording layer deposited as an amorphous structure by a sputtering method, which may be defined as photo-assisted crystallization. It is distinguished from crystallization by a conventional laser heating process. In other words, a thermal state required to crystallize the amorphous structure of the phase-change recording layer is slightly different depending on an amorphous state and material, but generally is at a temperature of 50% of a melting point. Therefore, as described above, in the case of the photo-assisted crystallization by the UV beam, while heat is generated by the UV lamp, a process temperature can be adjusted not more than 100° C. In addition, the UV beam affects a combined state between amorphous recording material particles to induce crystallization. As described above, the method of initializing a phase-change optical disk, for example, using a UV lamp, in accordance with a first embodiment of the present invention crystallizes the optical disk by maintaining the UV lamp within a constant intensity range for a short time of about 10 seconds, or applying a pulse of 1~10 times during irradiation of a low power pulse of the UV lamp.

Figure 4:
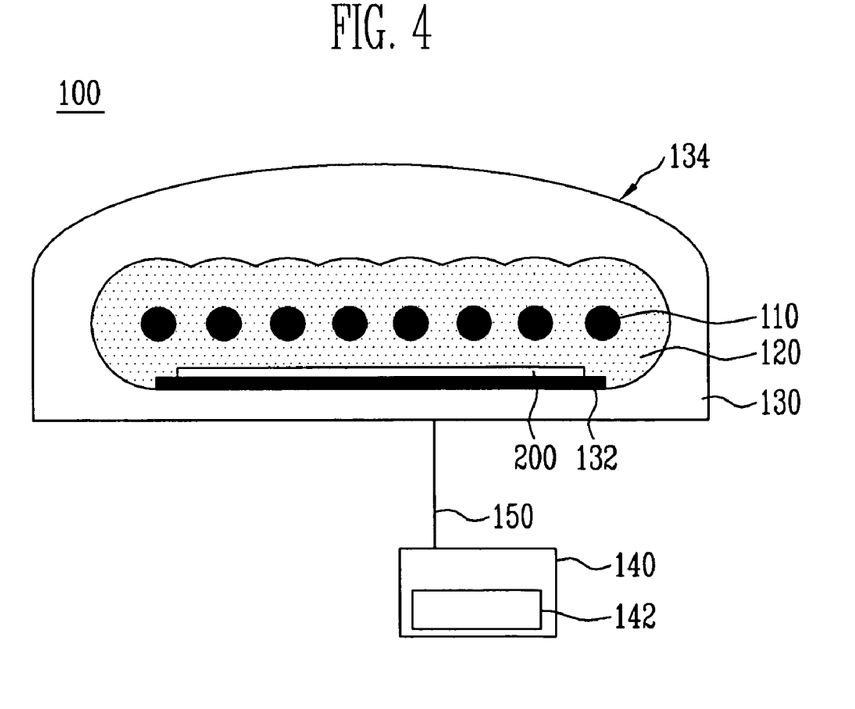
FIG. 4 is a schematic cross-sectional view of an apparatus for initializing an optical disk in accordance with an exemplary embodiment of the present invention.

FIG. 4 is a schematic cross-sectional view of an apparatus for initializing an optical disk in accordance with an exemplary embodiment of the present invention.

Referring to FIG. 4, the apparatus 100 for initializing a phase-change optical disk includes a UV lamp 110, a chamber 130 and a controller 140 in order to initialize an amorphous recording layer of an optical disk having a phase-change medium as a recording layer.

Specifically, the UV lamp 110 preferably has a diameter of about 5~20 mm, and emits a UV beam of 400 nm by 10~100%. The UV lamp 110 includes a plurality of lamps forming a UV lamp array, and may be fixedly supported in the chamber 130.

The chamber 130 appropriately supports the UV lamp 110 therein to locate a phase-change optical disk 200 in a UV beam effective region 120 of the UV lamp 110. As a result, the UV lamps 110 are arranged on the optical disk 200 using a phase-change material spaced apart form each other by a predetermined interval.

In addition, the chamber 130 includes a rotary plate 132 for mounting the phase-change optical disk 200. The rotary plate 132 rotates the phase-change optical disk 200 mounted on its surface. In addition, the chamber 130 includes a rounded inner wall 134 coated with gold to reflect the UV beam emitted from the UV lamp 110 toward the phase-change optical disk 200 mounted on the rotary plate 132. A material coated on the inner wall 134 may use a metal such as Cr, Ni and so on, or oxide such as aluminum oxide, zirconium oxide and so on, in addition to Au, having a large reflectivity.

Meanwhile, in order to uniformly initialize the recording layer in the optical disk 200, it is very important to locate the optical disk 200 within an appropriate distance (UV beam effective region 120) from the UV lamp. Therefore, when the optical disk 200 has a diameter of 25~150 mm, the UV lamp 110 employed in the present invention has a diameter of 5~20 mm, and emits a UV beam having a wavelength of 400 nm by 10~100%. Preferably, a distance between the UV lamp 110 and the rotary plate 132 maintains a distance of 5~30 mm. In addition, in order to increase initialization uniformity, it is preferable to rotate the rotary plate 132 at a speed of 60~600 rpm during UV irradiation.

The controller 140 is connected to the chamber 130 and the UV lamp 110 through a conducting wire 150 such as an electric wire. Basically, the controller 140 supplies a power source to the UV lamp 110. For this, the controller 140 may include a predetermined power source for maintaining an output of the UV lamp 110 within a range of 50~1000 mW/10 cm. In addition, the controller 140 may include a pulse regulator 142 for applying a shock wave such as a pulse to the optical disk 200 during low power irradiation of the UV lamp 110. In this case, the initialization apparatus in accordance with the present invention may initialize the phase-change optical disk 200 by using a certain intensity of UV beam or applying a high power pulse during low power UV beam irradiation. That is, the controller 140 may include a power source and a pulse regulator to maintain a temperature of a substrate of the optical disk 200 not more than 100° C. to prevent the substrate of the optical disk 200 from deteriorating while initializing the optical disk 200.

As described above, the present invention provides an initialization apparatus utilizing the UV lamp for initial crystallization of the recording layer of the optical disk. In accordance with the present invention, since an operating time of the UV lamp is short and its power is maintained at a low state, a temperature of the optical disk is increased a little, and since it takes a time shorter than 10 seconds to initialize the optical disk, it is possible to remarkably reduce the initialization time.

Figure 5A:
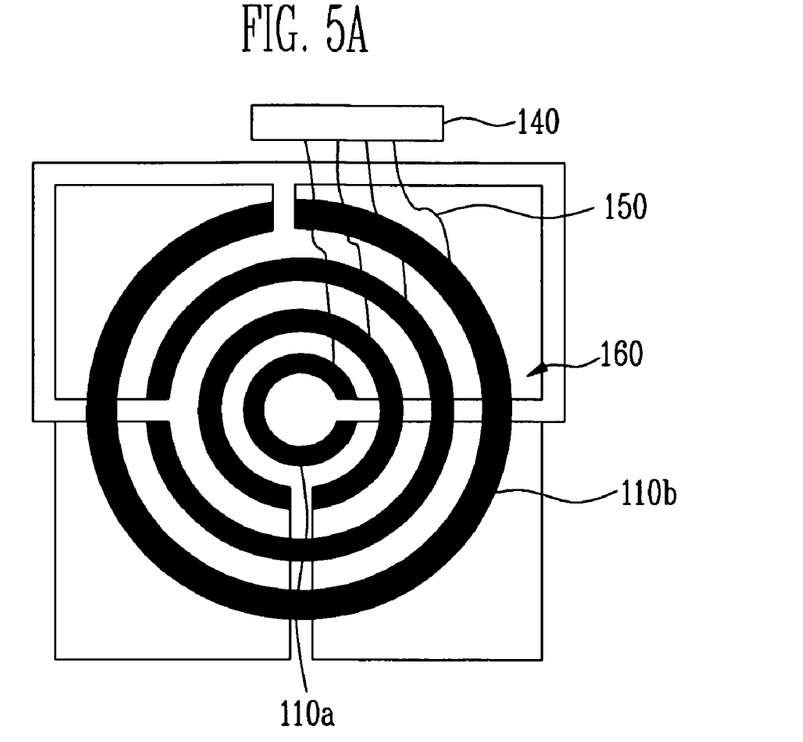
FIGS. 5A and 5B are views illustrating arrangement of a UV lamp adaptable to an apparatus of initializing an optical disk in accordance with an exemplary embodiment of the present invention.
Figure 5B:
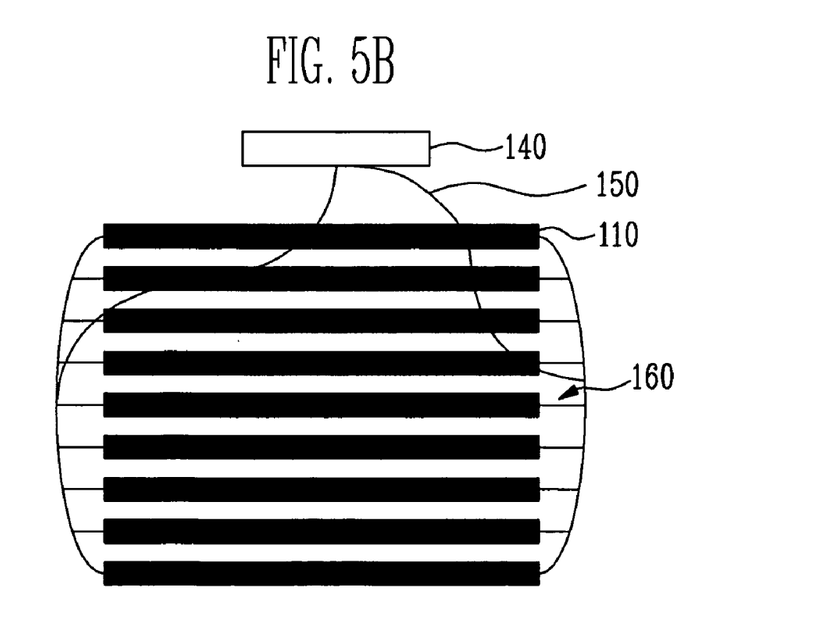

FIGS. 5A and 5B are views illustrating arrangement of a UV lamp adaptable to an apparatus and method of initializing an optical disk in accordance with an exemplary embodiment of the present invention.

FIG. 5A illustrates a UV lamp assembly employing a circular ring shaped UV lamp. Referring to FIG. 5A, a diameter of the UV lamp becomes larger as it goes from the innermost UV lamp 110a to the outermost UV lamp 110b. An interval between the lamps may be maintained by 5~20 mm. In consideration of the size of a current optical disk, the innermost UV lamp 110a has a diameter of 20~30 mm, and the outermost UV lamp 110b has a diameter of 120~150 mm. In addition, the UV lamp assembly 160 is connected to the controller 140 including the power source and the pulse regulator through the conducting wire 150 such as a power supply wire and so on.

FIG. 5B illustrates a UV lamp assembly employing a cylindrical rod shaped UV lamp. Referring to FIG. 5B, an interval between the UV lamps is 5~20 mm, and each lamp has a length of 120~150 mm. At this time, the UV lamp has a diameter of 5~20 mm.

As described above, an initialization method of the phase-change recording layer by UV beam may be performed using the UV lamp assembly through the following two methods.

First, there is a method of initializing an amorphous recording layer by irradiating UV beam with a constant wave. In this method, RF power of the UV lamp is regulated within 50~1000 nm/10 cm (length of the lamp). The RF power is appropriately determined under a condition that a temperature is not more than 100° C. when a UV beam is irradiated from the UV lamp located at 1 cm over the substrate or the rotary plate for mounting the optical disk.

Second, there is another method of applying about 5 times of pulses during low power irradiation. For example, 1~10 times of high power pulse is instantly applied by the pulse regulator to facilitate initialization of the recording layer during an operation time of 5~20 seconds of the lamp. Energy generated by the lamp may be represented as $\frac{1}{2}(CV^2)$ per unit area (V=voltage, C=capacitance). When C is $100\times10^{-6}$ at a voltage of 1000 V, an energy of about 50 J can be instantly generated.

Figure 6:
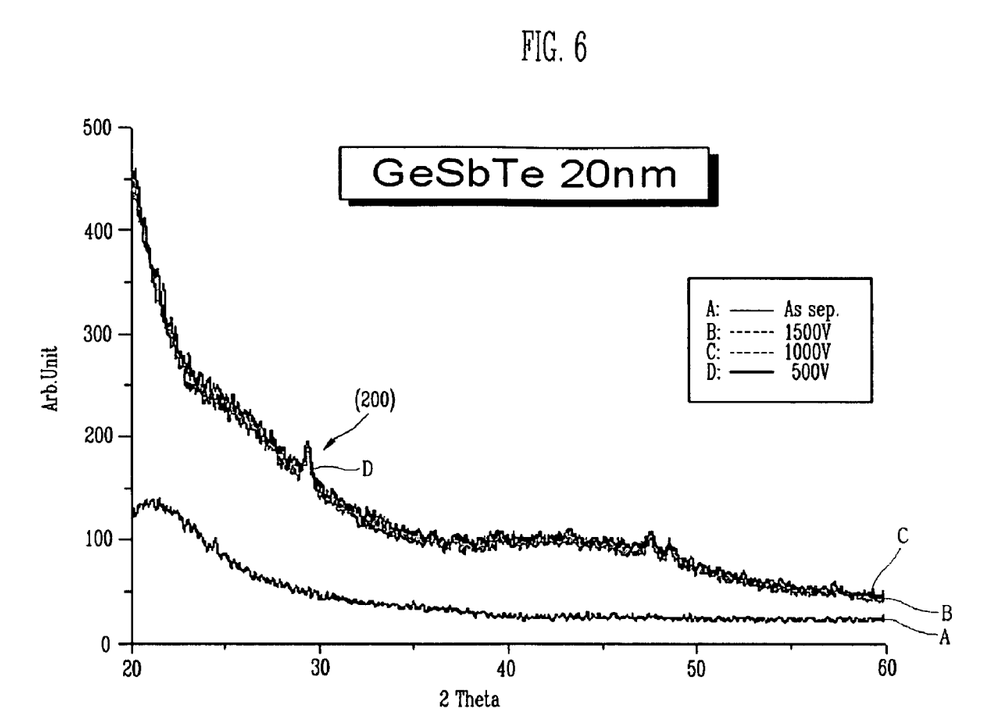
FIGS. 6 and 7 show an XRD analysis result obtained after an initialization test of an optical disk having a GeSbTe-based alloy as a recording layer using an apparatus and method of initializing an optical disk in accordance with an exemplary embodiment of the present invention.
Figure 7:
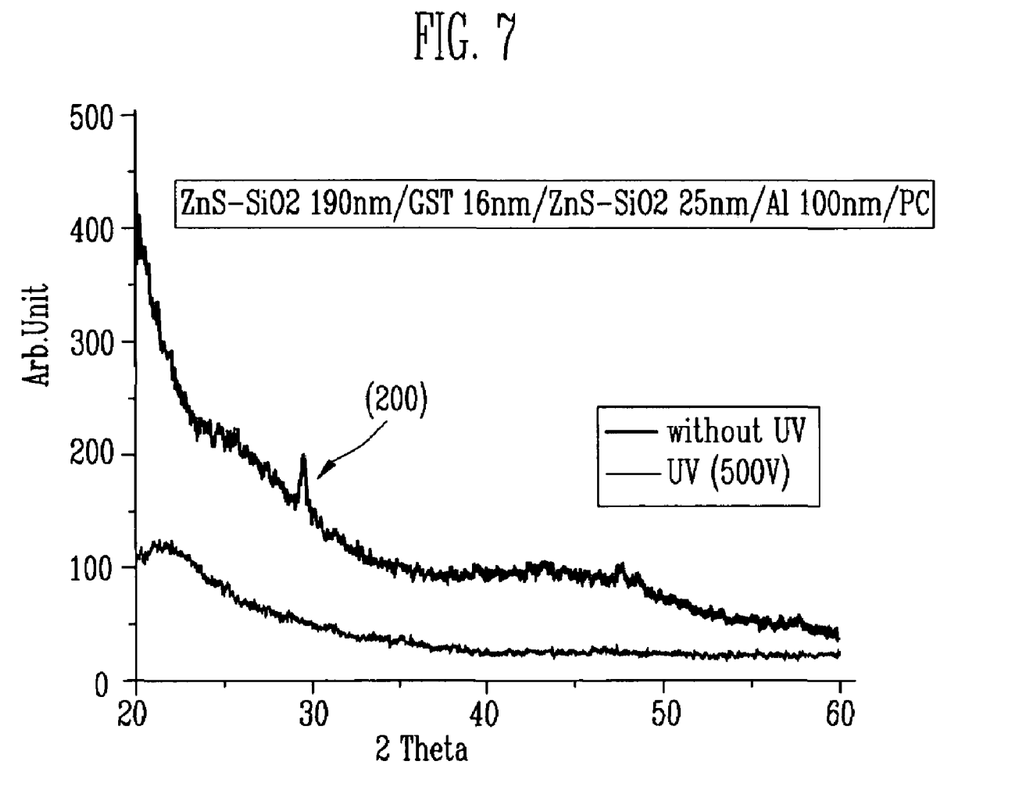

FIGS. 6 and 7 show an XRD analysis result obtained after an initialization test of an optical disk having a GeSbTe-based alloy as a recording layer using an apparatus and method of initializing an optical disk in accordance with an exemplary embodiment of the present invention.

FIG. 6 is a result, which is obtained through an XRD analysis, of variations of a crystalline structure depending on UV pulse power (5 times per 10 seconds) after lifting up the phase-change material GeSbTe (2:2:5) on the polycarbonate substrate by 20 nm. Referring to FIG. 6, it is appreciated that crystallization of the recording layer is generated even at a pulse power (D) of 500 V relatively lower than a pulse power (B, C) of 1500 V or 1000 V. In this process, a graph A represents when a UV beam is not used.

FIG. 7 shows a result obtained through an XRD analysis after depositing a thin layer in a structure of a conventional phase-change disk. Referring to FIG. 7, it is appreciated that crystallization (GeSbTe (200) peak around XRD 2 theta 30 degrees) of the recording layer is progressed at a lower pulse power (500 V, B) even in the phase-change optical disk structure of ZnS—SiO2 190 nm/GeSbTe 16 nm/ZnS—SiO2 25 nm/Al 100 nm/polycarbonate substrate. In this process, a graph A represents when a UV beam is not used.

As can be seen from the foregoing, the present invention is capable of obtaining the following effects.

First, it is possible to improve productivity by initializing a large area of an optical disk surface using a UV lamp at a time to remarkably reduce an initialization time within 10 seconds.

Second, considering that an initialization apparatus using a conventional laser head is very expensive, the UV beam initialization apparatus in accordance with the present invention can reduce the apparatus manufacturing cost by about 90% or more.

Third, it is possible to improve initialization uniformity through a method of initializing a large area of a disk surface at a time.

Fourth, it is possible to increase quality competitive power since a source of unnecessary contamination and defect is basically blocked by an initialization process.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An apparatus for initializing a phase-change optical disk, comprising:
    a UV lamp emitting a UV beam to an optical disk having a phase-change medium as a recording layer for a predetermined time to initialize the recording layer; and
    a controller supplying a power source to the UV lamp;
    wherein the UV lamp comprises a UV lamp assembly having a plurality of lamps with a circular ring shape, wherein a diameter of the plurality of circular ring shaped lamps becomes larger as the lamp goes from a center to a periphery of a chamber supporting the UV lamp and a distance between the circular ring shaped lamps is maintained by a predetermined interval.

2. The apparatus for initializing a phase-change optical disk according to claim 1, wherein the chamber is connected to the controller.

3. The apparatus for initializing a phase-change optical disk according to claim 2, wherein the chamber has an inner wall coated with one of metal and oxide having a large reflectivity.

4. The apparatus for initializing a phase-change optical disk according to claim 3, wherein the metal comprises at least one of Au, Cr, and Ni, and the oxide comprises at least one of aluminum oxide and zirconium oxide.

5. The apparatus for initializing a phase-change optical disk according to claim 2, wherein the chamber comprises a rotary plate for mounting the optical disk.

6. The apparatus for initializing a phase-change optical disk according to claim 5, wherein the chamber is formed to maintain a distance between the UV lamp and the rotary plate by 5~30 mm, and to rotate the rotary plate at 60~600 rpm.

7. The apparatus for initializing a phase-change optical disk according to claim 2, wherein the UV lamp has a diameter of 5~20 mm, and wherein 10~100% of UV beams emitted by the UV lamp have a wavelength of 400 nm.

8. The apparatus for initializing a phase-change optical disk according to claim 1, wherein the diameter of an innermost UV lamp of the circular ring shaped lamp assembly is 20~30 mm, and the diameter of an outermost UV lamp is 120~150 mm.

9. The apparatus for initializing a phase-change optical disk according to claim 1, wherein the controller controls an output of the UV lamp within 50~1000 mW/10 cm while maintaining a substrate of the optical disk at a temperature of not more than 100° C.

10. The apparatus for initializing a phase-change optical disk according to claim 1, wherein the controller further comprises a pulse regulator for applying a shock wave to the UV lamp while the UV beam is emitted to the optical disk for a predetermined time.

11. The apparatus for initializing a phase-change optical disk according to any one of claims 1-7, 8, 9, or 10, wherein the phase-change medium comprises a medium having a main component made of at least one selected from a group consisting of Ge, Sb, Te, In, Sn and Ga, and an additive made of at least one of Ag and Bi.

12. The apparatus for initializing a phase-change optical disk according to any one of claims 1-7, 8, 9, or 10, wherein the phase-change medium comprises one selected from a GeSbTe-based alloy and an AgInSbTe-based alloy.

13. A method of initializing a phase-change optical disk, comprising:
    locating an optical disk in a UV beam effective region of a UV lamp in order to initialize the optical disk having a phase-change medium as a recording layer, the UV lamp comprising a UV lamp assembly having plurality of lamps in the shape of a circular ring wherein a diameter of the plurality of circular ring shaped lamps becomes larger as the lamp goes from a center to a periphery of a chamber supporting the UV lamp and a distance between the circular ring shaped lamps is maintained by a predetermined interval; and
    emitting the UV beam from the UV lamp for a predetermined time to initialize the recording layer.

14. The method of initializing a phase-change optical disk according to claim 13, wherein emitting the UV beam for a predetermined time comprises controlling an output of the UV lamp within 50~1000 mW/10 cm while maintaining a substrate of the optical disk at a temperature of not more than 100° C.

15. The method of initializing a phase-change optical disk according to claim 13, further comprising applying a shock wave to the recording layer while a low power UV beam is emitted from the UV lamp for a predetermined time.

16. The method of initializing a phase-change optical disk according to claim 13, further comprising rotating the optical disk while a UV beam is emitted from the UV lamp for a predetermined time.

17. The method of initializing a phase-change optical disk according to any one of claims 13 to 16, wherein the phase-change medium comprises a medium having a main component made of at least one selected from a group consisting of Ge, Sb, Te, In, Sn and Ga, and an additive made of at least one of Ag and Bi.

18. The method of initializing a phase-change optical disk according to any one of claims 13 to 16, wherein the phase-change medium comprises one selected from a GeSbTe-based alloy and an AgInSbTe-based alloy.

19. An apparatus for initializing a phase-change optical disk, comprising:

a UV lamp emitting a UV beam to an optical disk having a phase-change medium as a recording layer for a predetermined time to initialize the recording layer; and a controller supplying a power source to the UV lamp;

wherein the UV lamp comprises a UV lamp assembly having a plurality of lamps with a cylindrical rod shape and an interval between the lamps of the cylindrical rod shaped lamp assembly is 5~20 mm, a length of each lamp is 120~150 mm, and the lamps are connected to the controller in parallel.

\* \* \* \* \*